Figure 1:
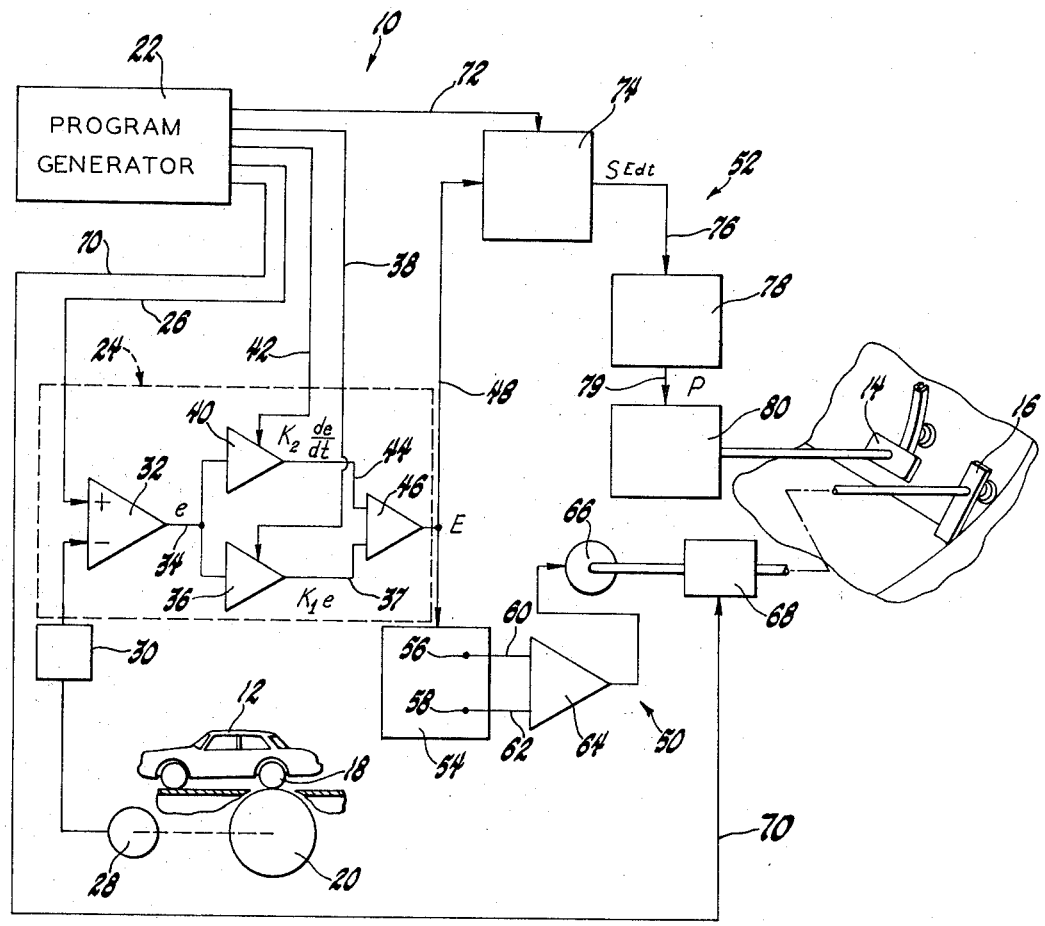

United States Patent
Campbell

[11] 3,712,126
[45] Jan. 23, 1973

[54] VEHICLE SPEED CONTROLLER
[75] Inventor: Robert Campbell, Roseville, Mich.
[73] Assignee: General Motors Corporation, Detroit, Mich.
[22] Filed: Nov. 23, 1970
[21] Appl. No.: 91,892

[52] U.S. Cl. ................................73/117, 180/105 E
[51] Int. Cl. ..............................................B60k 31/00
[58] Field of Search........................180/105–109, 98; 192/3 R, 3 G, 3 TR, 3 T; 123/102, 103; 246/182 B, 187 B; 73/117

[56] References Cited

UNITED STATES PATENTS

| | | | |
|---|---|---|---|
| 3,333,463 | 8/1967 | Hollinghurst | 73/117 |
| 3,270,199 | 8/1966 | Smith | 246/187 B X |
| 3,437,182 | 4/1969 | Mueller | 192/3 G |
| 1,512,167 | 10/1924 | Gore | 192/3 G |
| 3,116,807 | 1/1964 | Wilson | 123/102 X |
| 3,192,382 | 6/1965 | Allison | 192/3 G X |
| 3,304,421 | 2/1967 | Wright | 246/182 B |
| 3,287,555 | 11/1966 | Livingston | 246/187 B |
| 3,575,256 | 4/1971 | Jania | 123/102 |

*Primary Examiner*—Kenneth H. Betts
*Attorney*—Jean L. Carpenter and Paul Fitzpatrick

[57] ABSTRACT

Apparatus for controlling the speed of a vehicle in accordance with a predetermined schedule by manipulating the vehicle's accelerator and brake pedals. A program generator generates a reference signal that is proportional to the desired speed of the vehicle during the predetermined schedule. The reference signal is compared with a feedback signal that is proportional to the actual speed of the vehicle by a signal generating network which generates a control signal in accordance with the difference between the reference and feedback signals. An accelerator pedal control network that includes a DC motor which is driven by uniform high voltage pulses manipulates the accelerator pedal in accordance with the control signal. A brake pedal control network that includes a pneumatic actuator and an electrical to pressure transducer manipulates the brake pedal in accordance with the control signal. The operativeness of the brake pedal control network and the accelerator pedal control network and the amplification of the signal generating network are controlled by the program generator in accordance with the predetermined schedule.

4 Claims, 2 Drawing Figures

INVENTOR.
Robert Campbell
BY
Paul Fitzpatrick
ATTORNEY

VEHICLE SPEED CONTROLLER

This invention relates to vehicle test apparatus and, more particularly, to apparatus for controlling the speed of a vehicle having accelerator and brake pedals.

In the vehicle testing art many speed controlling devices have heretofore been employed to control the speed of a vehicle. Indeed, in view of the emphasis presently being placed on controlling emissions from a vehicle when the vehicle speed is varied according to a predetermined schedule, it appears that the role of vehicle speed controlling apparatus in vehicle testing is increasing in importance. In vehicles employing conventional control apparatus it is well recognized that the speed of the vehicle may be changed by either manipulating the vehicle's brake pedal or the vehicle's accelerator pedal, both of which are found in virtually all modern motor vehicles. However, separate instruments have generally been employed to manipulate the brake and accelerator pedals in a vehicle as in a predetermined test only one or the other pedal generally needs to be manipulated in a precisely controlled fashion that is characteristic of test equipment, as opposed to a human driver. For example, a vehicle brake system may be tested by apparatus which depresses the vehicle's brake pedal so as to achieve a specified rate of acceleration that may be duplicated in subsequent tests. To perform various other tests that require either a constant speed or predetermined acceleration of the vehicle a separate accelerator pedal control apparatus is generally employed. To increase the vehicle's speed the accelerator pedal control apparatus depresses the accelerator pedal of the vehicle. To decrease the vehicle's speed the accelerator pedal is merely released sufficiently for the vehicle's inertia to slow the vehicle to a desired speed.

Several types of actuators for depressing vehicle pedals have heretofore been proposed. Where there is a need for the actuator to rapidly generate relatively large force levels a pneumatic actuator is especially well suited, as where depressing a vehicle brake pedal in a vehicle brake system that is not provided with a power assist. However, controlling the accelerator pedal of a vehicle requires an actuator that is considerably more sensitive as very slight changes in the accelerator pedal position result in relatively large changes in the vehicle speed. Accordingly, accelerator pedal actuators have generally been driven by an electrical motor. Since an AC motor system tends to be more noisy than a DC motor system, which inhibits the use of an AC motor system in acoustic testing, a DC motor driven actuator is preferred for manipulating vehicle accelerator pedals. However, a DC motor which is driven by a DC voltage requires that a relatively large voltage be applied to the motor merely to overcome the motor inertia. Once sufficient voltage is applied to the motor to overcome its inertia a considerably amount of damping is typically required in the DC motor drive system to assure that the system is stable; i.e., that it does not begin to oscillate. Since a relatively large time delay exists between the depressing of an accelerator pedal and an increase in the vehicle speed a DC motor drive system which manipulates a vehicle accelerator pedal will most likely oscillate between the extremes of fully depressing the accelerator pedal or fully releasing the accelerator pedal unless the system contains substantial damping.

In view of the foregoing it is an object of this invention to provide vehicle speed control apparatus which controls the speed of a vehicle according to a predetermined schedule by manipulating both the vehicle's brake and accelerator pedals.

It is another object of this invention to provide vehicle speed control apparatus which employs a pneumatic actuator to manipulate a vehicle's brake pedal and an actuator driven by a DC motor to manipulate the vehicle's accelerator pedal so as to control the speed of the vehicle in accordance with a predetermined schedule.

It is a further object of this invention to provide vehicle speed controlling apparatus which incorporates a DC motor driven accelerator pedal actuator in which the DC motor is driven by a train of uniform voltage pulses, the frequency and polarity of the pulses being varied to manipulate the accelerator pedal.

It is a more specific object of this invention to provide vehicle speed controlling apparatus which controls the speed of a vehicle by manipulating the vehicle's accelerator and brake pedals in accordance with a control signal that is obtained by generating an error signal that is proportional to the difference between the desired and the actual vehicle speeds, amplifying both the error signal and the time rate of change of the error signals by amplification factors that may be varied in accordance with a predetermined schedule, and combining the amplified error signal with the amplified time rate of change signal.

Figure 2:
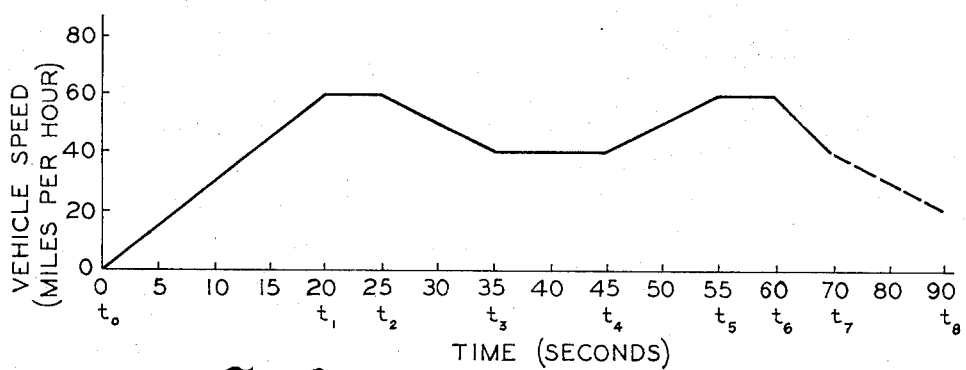

The foregoing and other objects and advantages of the subject invention will become apparent from the accompanying description and drawing, in which:

FIG. 1 illustrates a vehicle speed controlling system which incorporates the principles of the subject invention; and FIG. 2 graphically illustrates a vehicle speed schedule which may be followed by the apparatus of FIG. 1.

As shown in FIG. 1, a speed controller 10 according to the principles of the subject invention may be employed to control the speed of a vehicle 12 by manipulating the brake and accelerator pedals 14 and 16, respectively, of the vehicle 12. While the speed controller 10 may be designed for use in the vehicle 12 while the vehicle 12 is being driven on a highway it is primarily intended to be employed as illustrated in FIG. 1; that is, to control the speed of the vehicle 12 rear wheels 18 relative to a set of dynamometer rolls 20, on which the rear wheels 18 are positioned. In the illustrated embodiment the engine (not shown) of the vehicle 12 is presumed to be driving the rear wheels 18, which in turn are driving the dynamometer rolls 20. By setting the dynamometer rolls 20 to provide substantially the same resistance to the rotation of the rear wheels 18 as would be provided the rear wheels 18 by a highway the condition of the vehicle 12 being driven on a highway may be duplicated in the laboratory, as persons versed in the art will appreciate. The rotational speed of the dynamometer rolls 20 is therefore proportional to the rotational speed of the rear wheels 18 relative to the dynamometer rolls 20. Thus it is convenient to describe the speed of the vehicle 12 in terms of the rotational speed of the dynamometer rolls 20, as will hereafter be the case in this description, when the vehicle 12 is being operated in a laboratory.

To control the speed of the vehicle 12 in accordance with a predetermined schedule, such as that illustrated in FIG. 2, a program generator 22 is employed for generating a reference voltage signal that is proportional to the desired speed of the vehicle 12 at a certain time. In the illustrated embodiment the reference voltage signal is transmitted to a control signal generating network 24 through a lead 26. The control signal generating network 24 compares the reference voltage signal with a feedback voltage signal that is generated by a tachometer generator 28 and filtered by a filter 30 that removes high frequency transients from the feedback voltage signal, the transients primarily being sensed by the commutators and brushes in the tachometer generator 28. Since the tachometer generator 28 is drivably coupled to the dynamometer rolls 20 the feedback signal which is transmitted through the filter 30 to the control signal generating network 24 is proportional to the actual speed of the vehicle 12.

The input stage to the control signal generating network 24 is a differential amplifier 32 that subtracts the feedback signal from the reference signal and generates an error signal $e$ on a lead 34 that is proportional to the difference between the feedback and reference signals. The control signal generating network 24 also includes a proportional gain amplifier 36 which amplifies the error signal $e$ by an amplification factor $K_1$ which is varied in accordance with a signal that is also generated by the program generator 22 and applied to a lead 38. The voltage which is generated by the proportional gain amplifier 36 and applied to a lead 37 is thus equal to the product $K_1 e$.

In addition, the control signal generating network 24 also includes a rate gain amplifier 40 which amplifies the time rate of change $de/dt$ of the error signal $e$ by a second variable amplification factor $K_2$, which is varied in accordance with another voltage that is generated by the program generator 22 and applied to a lead 42. The output voltage that is generated by the rate gain amplifier 40 and applied to a lead 44 therefore equals the product of $K_2(de/dt)$.

A summing operational amplifier 46 is provided in the control signal generating network 24 for algebraically adding the signals on the leads 37 and 44 so as to generate a control signal voltage E on a lead 48 that is proportional to the sum of $K_1 e + K_2 de/dt$. While persons versed in the art will appreciate that many different commercially available items may be employed as the filter 30, and the amplifiers 32, 36, 40, and 46 these units may, by way of example and without limitation, incorporate the model 3004/15 operational amplifiers which are obtainable from the Burr-Brown Research Corporation of Tucson, Arizona.

The control signal E which is applied to the lead 48 by the control signal generative network 24 is simultaneously applied to an accelerator pedal control network 50 and a brake pedal control network 52. However, at a given time only one of the pedal control networks 50 and 52 is normally operative, as will subsequently be explained.

The accelerator pedal control network 50 includes an analog-to-pulse-rate converter 54 that monitors the control signal E, which is an analog signal, and generates a train of constant duration pulses on one of two output terminals 56 and 58 in accordance with the control signal E. When the control signal E on the lead 48 is positive, which indicates that the desired speed of the vehicle 12 is greater than the actual speed of the vehicle 12, the converter 54 generates a pulse train on the first output terminal 56. However, when the control voltage E on the lead 48 is negative, which indicates that the desired speed of the vehicle 12 is less than the actual speed of the vehicle 12, the converter 54 generates a pulse train on the second output terminal 58. Regardless of the terminal to which they are applied the repetition rate, or frequency, of the voltage pulses generated by the converter 54 is proportional to the magnitude of the control voltage E on the lead 48.

The voltage pulses generated by the converter 54 are applied through a pair of leads 60 and 62 to a power amplifier 64 which amplifies the voltage pulses and applies them to a DC motor 66. The motor 66 is drivably coupled through a clutch 68 and suitable mechanical actuating mechanisms (not shown) to the accelerator pedal 16 so as to depress the accelerator pedal 16 when the converter 54 generates the voltage pulses on the first terminal 56 and the power amplifier 64 applies the amplified voltage pulses to the motor 66 according to a first polarity. When the converter 54 generates a voltage pulse train on the second terminal 58 the power amplifier 64 reverses the polarity of the voltage pulses which it applies to the motor 66 so as to reverse the motor 66 direction of rotation and hence release the accelerator pedal 16.

While the selection of components for an actual installation may vary in accordance with the particular requirements of the speed controller 10 it has been found that the accelerator pedal control network 50 performs satisfactorily under a wide range of operating conditions when the converter 54 is a model number 575A-3 analog-to-pulse-rate converter obtainable from the Automation Development Company of Culver City, California, and the power amplifier 64 is the model SA-25 power amplifier obtainable from the Philbrick Nexus Company of Dedham, Massachusetts. These components may be used in conjunction with a model 102A-175-9 motor, obtainable from the Globe Motor Company of Dayton, Ohio, and a model 20TM206—SL soleniod clutch, obtainable from the Tec Magnetics Company of Sante Fe Springs, California, to manipulate the accelerator pedal 16 in accordance with the control voltage E.

It should be noted that an important advantage of the subject invention is obtained by driving the motor 66 with a voltage pulse train having substantially uniform voltage pulses which occur at a frequency that is proportional to the control voltage on the lead 48. By employing positive drive actuating mechanisms between the motor 66 and the accelerator pedal 16 a holding torque need not be developed by the motor 66 to maintain the accelerator pedal 16 depressed. For example, the actuating mechanism may include a threaded shaft which is moved axially when rotated by the motor 66 so as to move the accelerator pedal 16, the axial position of the threaded shaft being maintained by the clutch 68. By way of example, the actuating mechanism may incorporate the apparatus disclosed in a patent application which is identified as U.S. Ser. No. 91,893 of Nov. 23, 1970, now Pat. No. 3,663,593 and which is of common ownership with this application. While these applications are being files simultaneously the one just identified is being filed by both myself and Mr. Antonio Pirrello of Lincoln Park, Michigan.

While the motor 66 is designed to be driven by a DC power supply persons versed in the art will appreciate that a considerable voltage needs to be applied to the motor 66 before it starts to rotate due to frictional losses within the motor 66, the clutch 68, the mechanical actuating mechanisms, and the accelerator pedal 16. However, once these frictional forces are overcome a much smaller voltage may be applied to the motor 66 to keep it rotating. To apply an analog, or DC, voltage signal to the motor 66 would thus require considerable damping in the system to prevent the motor 66 from depressing the accelerator pedal 16 a greater amount than is required by the difference between the desired and actual vehicle 12 speeds. However, when a brief high voltage pulse is applied to the motor 66 a very small rotation of the motor 66 armature results. This is because the high voltage of the voltage pulse overcomes the friction forces just described but the short duration of the voltage pulse precludes the motor 66 from being rotated an excessive amount. Accordingly, the motor 66 is rotated a predetermined increment as each of the voltage pulses generated by the power amplifier 64 is applied to the motor 66. When the aforediscussed components are employed in the accelerator pedal control network 50, pulses of 20 volts in magnitude and 20 milliseconds in duration are applied to the motor 66. Of course, during the times the desired speed of the vehicle 12 is identical with the actual speed of the vehicle 12 the power amplifier 64 does not generate a train of voltage pulses and the motor 66 is quiescent, the accelerator pedal 16 being maintained at a constant position by the mechanical actuating mechanisms.

When it is necessary for the speed of the vehicle 12 to be decreased by applying the brake pedal 14 the program generator 22 transmits a voltage signal to the clutch 68 through a lead 70 so as to cause the clutch 68 to prevent the motor 66 from depressing the accelerator pedal 16. Indeed, if the actuating mechanism is spring biased the voltage signal may be of such a nature as to effect a complete release of the accelerator pedal 16. In addition, the program generator 22 transmits another voltage signal through a lead 72 to the brake pedal control network 52 so as to cause the brake pedal control network 52 to depress the brake pedal 14 in accordance with the control voltage E on the lead 48.

The brake pedal control network 52 includes an integrator 74, such as the model KM-47C unit obtainable from the K & M Electronics Company of Hackensack, New Jersey, that generates a voltage signal which is proportional to the integral of the control signal E when the integrator 74 is activated by the program generator 22. The purpose of the integrator 74 will subsequently become apparent in an operational description of the brake pedal control network 52. The integral of the control signal E is applied through a lead 76 to an electric-to-pressure transducer 78, such as the model N6810-3 unit obtainable from the Johnson Service Company of Milwaukee, Wisconsin, that converts the integral of the control signal E to a pressure signal P. The pressure signal P is in turn applied as shown at 79 to a spring loaded pneumatic actuator 80, which is also available from the Johnson Service Company under model number D-251-304, that is drivably coupled to the brake pedal 14 so as to depress the brake pedal 14 in accordance with the control signal E, as will now be explained in conjunction with FIG. 2.

FIG. 2 illustrates a typical schedule of the desired vehicle 12 speed for a certain test, though it is to be understood that the graphical representation of FIG. 2 is for descriptive purposes only and is not intended to represent an actual vehicle test. According to the schedule of FIG. 2, the vehicle 12 is to be accelerated from 0 to 60 miles per hour during the interval from the time $t_0$ to time $t_1$. From the time $t_1$ to the time $t_2$ the vehicle 12 is to be driven at a constant speed of 60 miles per hour and from the time $t_2$ to the time $t_3$ the vehicle 12 is to be decelerated at a uniform rate from 60 miles per hour to 40 miles per hour, the deceleration being so gradual as to be effected without manipulating the brake pedal 14. From the time $t_3$ to the time $t_4$ the vehicle is maintained at a steady 40 miles per hour and between the times $t_4$ and $t_5$ the vehicle 12 is again accelerated to a speed of 60 miles per hour, which is maintained until the time $t_6$. At the time $t_6$ the vehicle 12 is rapidly decelerated until the time $t_7$ by depressing the brake pedal 14. At the time $t_7$ the brake pedal 14 is released and the vehicle 12 is allowed to coast until the time $t_8$, which completes the test.

For the speed controller 10 to control the speed of the vehicle 12 in accordance with the schedule specified in FIG. 2 the reference voltage signal generated by the program generator 22 conforms to the vehicle speeds illustrated in FIG. 2 from the time $t_0$ to the time $t_7$. In addition, since it is necessary for the vehicle 12 to be accelerated by depressing the accelerator pedal 16 at the time $t_0$ the program generator 22 applies a positive voltage through the lead 70 to the solenoid clutch 68, energizing the solenoid clutch 68 so as to drivably connect the motor 66 to the accelerator pedal 16. Accordingly, as the reference voltage signal is increased between the time $t_0$ and the time $t_1$ the positive error voltage $e$ that is generated by the differential amplifier 32 and the correspondingly large control signal E cause the accelerator pedal control network 50 to depress the accelerator pedal 16 in the fashion previously explained. From the time $t_1$ to the time $t_2$ there is substantially no difference between the desired and the actual vehicle speed so both the error signal $e$ generated by the differential amplifier 32 and the control signal E on the lead 48 are insufficient to cause the converter 54 to generate voltage pulses. The accelerator pedal control network 50 thus remains quiescent between the time $t_1$ and the time $t_2$.

Between the time $t_2$ and the time $t_3$ the reference voltage signal decreases faster than the feedback signal that is generated by the tachometer generator 28. Accordingly, the error signal $e$ generated by the differential amplifier 32 becomes negative and the resulting negative control signal E causes the accelerator pedal control network 50 to slowly release the accelerator pedal 16. From the time $t_3$ to the time $t_4$ the accelerator pedal 16 is again held stationary by the accelerator pedal control network 50 and from the time $t_4$ to the time $t_5$ the vehicle 12 is accelerated as it is from the time $t_0$ to the time $t_1$. Between the times $t_5$ and $t_6$ the accelerator pedal 16 is again held substantially stationary by the accelerator pedal network 50 and the actual speed of the vehicle 12 is substantially the same as the desired speed of the vehicle 12.

Between the times $t_6$ and $t_7$ the schedule in FIG. 2 calls for the vehicle 12 to be slowed by depressing the brake pedal 14. Accordingly at the time $t_6$ the solenoid clutch 68 is deenergized by the program generator 22 so as to quickly release the accelerator pedal 16. Simultaneously with the release of the accelerator pedal 16 the lead 72 is energized by the program generator so as to activate the brake pedal control network 52, which depresses the brake pedal 14 in accordance with the control signal E on the lead 48 at the time $t_6$.

As persons versed in the art will appreciate, the only way in which the brake pedal control network 52 can rapidly decelerate the vehicle 12 is to maintain the brake pedal 14 depressed. However, if the vehicle 12 is decelerated from the time $t_6$ to the time $t_7$ at the desired rate the actual speed of the vehicle 12 is the same as its desired speed. Under these conditions both the error signal $e$ and the control signal E are at zero volts. Since the brake pedal control network 52 is required to maintain the brake pedal 14 depressed when the control signal E is at zero volts the integrator 74 is provided to maintain sufficient voltage on the lead 76 to assure that the brake pedal 14 remains depressed. The integrator 74 thus serves as a memory in the brake pedal control network 52 to keep the brake pedal !14 depressed when the error signal $e$ goes to zero.

The brake pedal control network 52 continues to depress the brake pedal 14 until the time $t_7$, at which time the schedule illustrated in FIG. 2 specifies that the vehicle 12 speed is to be decreased by allowing the vehicle to coast. Accordingly, at the time $t_7$ the program generator 22 deenergizes the lead 72 so as to prevent the brake pedal control network 52 from depressing the brake pedal 14. As soon as the lead 72 is deenergized the spring loaded actuator 80 releases the brake pedal 14 and, since the lead 70 is also deenergized, the vehicle 12 is allowed to decelerate solely under the influence of the vehicle 12 inertia and frictional forces until the time $t_8$, which completes the test.

While the speed controller 10 is designed to control the vehicle 12 speed over a wide variety of test cycles the preciseness of control required may differ between various phases of a test. Accordingly, the program generator 22 may be designed to vary the amplification factors $K_1$ and $K_2$ of the amplifiers 36 and 40 in accordance with the particular test being performed.

For example, in the test thus described it may be very necessary to maintain precisely the constant speeds of the vehicle 12 during the intervals between the times $t_1$ and $t_2$, $t_3$ and $t_4$, and $t_5$ and $t_6$. Since holding the vehicle 12 at a constant speed requires that the error signal $e$ be minimized the proportional gain amplification factor $K_1$ is increased by the program generator 22 applying a higher voltage to the lead 38 during these times.

On the other hand, when accelerating the vehicle 12, such as between the times $t_0$ and $t_1$, it is of primary importance to control the vehicle 12 speed in accordance with the time rate of change of the error signal $e$. Accordingly, during periods of acceleration the program generator 22 increases the voltage applied to the lead 42 so as to increase the rate gain amplification factor $K_2$. The speed controller 10 is thus able to closely control the vehicle 12 speed by selectively increasing the amplification factors $K_1$ and $K_2$. Indeed, the amplification factors $K_1$ and $K_2$ may be selectively increased to such large values that the overall system gain of the speed controller 10 would cause the speed controller 10 to become unstable if both of the amplification factors $K_1$ and $K_2$ were left at their increased values. However, by only selectively increasing the amplification factors $K_1$ and $K_2$ in accordance with a predetermined schedule the stability of the speed controller 10 is assured.

It is thus apparent that the aforedescribed apparatus is capable of precisely controlling the speed of a vehicle according to a predetermined schedule, though persons versed in the art will appreciate that various modifications of this apparatus may be made without departing from the spirit of this invention.

For purposes of interpreting the appended claims, which establish the scope of my invention, it should be kept in mind that the term "vehicle speed" refers to the apparent speed of the vehicle's driving wheels relative to the surface on which they rest, though in reality the vehicle may be substantially motionless with its driving wheels resting on a set of dynamometer rolls.

What is claimed is:

1. Apparatus for controlling the speed of a vehicle having accelerator and brake pedals comprising, in combination, means for generating a reference signal that is indicative of a desired speed of the vehicle, means for generating a feedback signal that is determined by the actual speed of the vehicle, means responsive to the reference and the feedback signals for generating an error signal that is determined by the difference between the reference and the feedback signals, a first amplifier for amplifying the error signal by a first variable amplification factor, a second amplifier for amplifying the time rate of change of the error signal by a second variable amplification factor, control signal generating means for generating a control signal that is proportional to the sum of the amplified error signal and the amplified time rate of change of the error signal, means for varying the variable amplification factors of the amplifiers according to a predetermined schedule, brake pedal control means responsive to the control signal for operating the brake pedal in accordance with the control signal effective to decrease the vehicle speed when the actual vehicle speed exceeds the desired vehicle speed, accelerator pedal control means responsive to the control signal for operating the accelerator pedal in accordance with the control signal effective to increase the vehicle speed when the actual vehicle speed is less than the desired vehicle speed, and means for controlling the operativeness of the brake pedal control means and the accelerator pedal control means according to a certain schedule whereby the brake pedal control means may be made inoperative when increasing the vehicle speed through use of the accelerator pedal control means and the accelerator pedal control means may be made inoperative when decreasing the vehicle speed through use of the brake pedal control means.

2. Apparatus for controlling the speed of a vehicle having accelerator and brake pedals comprising, in combination, means for generating a reference signal that is indicative of a desired speed of the vehicle;

means for generating a feedback signal that is determined by the actual speed of the vehicle; means responsive to the reference and the feedback signals for generating an error signal that is determined by the difference between the reference and the feedback signals; brake pedal control means responsive to the error signal for operating the brake pedal in accordance with the error signal effective to decrease the vehicle speed when the actual vehicle speed exceeds the desired vehicle speed; accelerator pedal control means responsive to the error signal for operating the accelerator pedal in accordance with the error signal effective to increase the vehicle speed when the actual vehicle speed is less than the desired vehicle speed, the accelerator pedal control means including means responsive to the error signal for generating a variable frequency train of uniform pulses having a first polarity when the desired vehicle speed exceeds the actual vehicle speed and a second polarity when the actual vehicle speed exceeds the desired vehicle speed, the frequency of the pulse train being proportional to the difference between the desired and the actual vehicle speeds, and a DC motor that is responsive to the pulse train and drivably coupled to the accelerator pedal effective to incrementally move the accelerator pedal as each pulse is applied to the motor, thereby moving the accelerator pedal in accordance with the polarity and the frequency of the pulses; and means for controlling the operativeness of the brake pedal control means and the accelerator pedal control means according to a certain schedule whereby the brake pedal control means may be made inoperative when increasing the vehicle speed through use of the accelerator pedal control means and the accelerator pedal control means may be made inoperative when decreasing the vehicle speed through use of the brake pedal control means.

3. Apparatus for controlling the speed of a vehicle having accelerator and brake pedals comprising, in combination, means for generating a reference signal that is indicative of a desired speed of the vehicle; means for generating a feedback signal that is determined by the actual speed of the vehicle; means responsive to the reference and the feedback signals for generating an error signal that is determined by the difference between the reference and the feedback signals; a first amplifier for amplifying the error signal by a first variable amplification factor; a second amplifier for amplifying the time rate of change of the error signal by a second variable amplification factor; control signal generating means for generating a control signal that is proportional to the sum of the amplified error signal and the amplified time rate of change of the error signal; means for varying the variable amplification factors of the amplifiers according to a predetermined schedule; brake pedal control means responsive to the control signal for operating the brake pedal in accordance with the control signal effective to decrease the vehicle speed when the actual vehicle speed exceeds the desired vehicle speed; accelerator pedal control means responsive to the control signal for operating the accelerator pedal in accordance with the control signal effective to increase the vehicle speed when the actual vehicle speed is less than the desired vehicle speed, the accelerator pedal control means including means responsive to the control signal for generating a variable frequency train of uniform pulses having a first polarity when the desired vehicle speed exceeds the actual vehicle speed and a second polarity when the actual vehicle speed exceeds the desired vehicle speed, the frequency of the pulse train being proportional to the difference between the desired and the actual vehicle speeds, and a DC motor that is responsive to the pulse train and drivably coupled to the accelerator pedal effective to incrementally move the accelerator pedal as each pulse is applied to the motor, thereby moving the accelerator pedal in accordance with the polarity and the frequency of the pulses; and means for controlling the operativeness of the brake pedal control means and the accelerator pedal control means according to a certain schedule whereby the brake pedal control means may be made inoperative when increasing the vehicle speed through use of the accelerator pedal control means and the accelerator pedal control means may be made inoperative when decreasing the vehicle speed through use of the brake pedal control means.

4. Apparatus for controlling the speed of a vehicle having accelerator and brake pedals comprising, in combination, means for generating a reference signal that is indicative of a desired speed of the vehicle; means for generating a feedback signal that is determined by the actual speed of the vehicle; means responsive to the reference and the feedback signals for generating an error signal that is determined by the difference between the reference and the feedback signals; a first amplifier for amplifying the error signal by a first variable amplification factor; a second amplifier for amplifying the time rate of change of the error signal by a second variable amplification factor; control signal generating means for generating a control signal that is proportional to the sum of the amplified error signal and the amplified time rate of change of the error signal; means for varying the variable amplification factors of the amplifiers according to a predetermined schedule; brake pedal control means responsive to the control signal for operating the brake pedal in accordance with the control signal effective to decrease the vehicle speed when the actual vehicle speed exceeds the desired vehicle speed, the brake pedal control means including means for integrating the control signal and means for operating the brake pedal in accordance with the integrated control signal; accelerator pedal control means responsive to the control signal for operating the accelerator pedal in accordance with the control signal effective to increase the vehicle speed when the actual vehicle speed is less than the desired vehicle speed, the accelerator pedal control means including means responsive to the control signal for generating a variable frequency train of uniform pulses having a first polarity when the desired vehicle speed exceeds the actual vehicle speed and a second polarity when the actual vehicle speed exceeds the desired vehicle speed, the frequency of the pulse train being proportional to the difference between the desired and the actual vehicle speeds, and a DC motor that is responsive to the pulse train and drivably coupled to the accelerator pedal effective to incrementally move the accelerator pedal as each pulse is applied to the motor, thereby moving the accelerator pedal in accordance with the polarity and the frequency of the pulses; and means for controlling the operativeness of the brake pedal control means and the accelerator pedal control means according to a certain schedule whereby the brake pedal control means may be made inoperative when increasing the vehicle speed through use of the accelerator pedal control means and the accelerator pedal control means may be made inoperative when decreasing the vehicle speed through use of the brake pedal control means.

* * * * *